July 27, 1937. E. F. TANNEWITZ 2,088,496
ANTISQUEAK FINISH STRIP
Original Filed Jan. 9, 1934
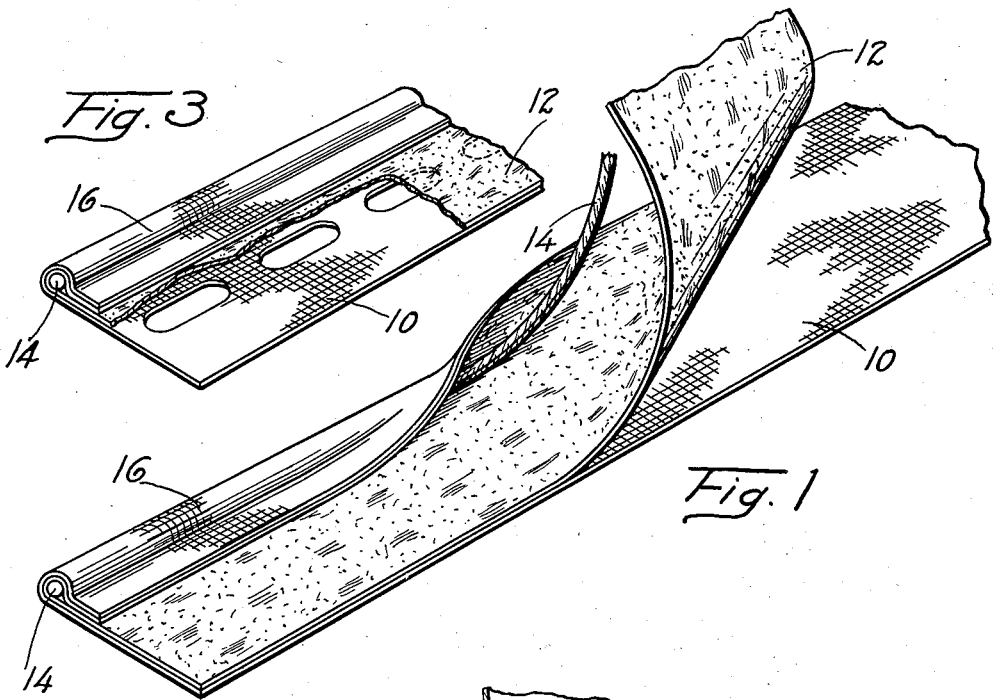
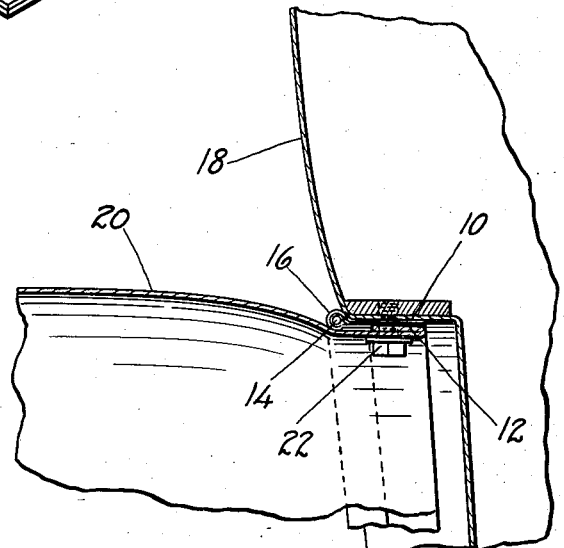
INVENTOR.
Edward F. Tannewitz
BY Parker & Burton
ATTORNEYS.

Patented July 27, 1937

2,088,496

UNITED STATES PATENT OFFICE 2,088,496

ANTISQUEAK FINISH STRIP

Edward F. Tannewitz, Detroit, Mich.

Application January 9, 1934, Serial No. 705,837
Renewed October 3, 1935

6 Claims. (Cl. 280—152)

My invention relates to an improved antisqueak finish strip of the character generally used in the automobile industry between adjacent metal parts, such as a fender and the adjacent portion of the body, and provided with a finish bead along one margin which covers the joint between said metal parts.

Finish strips or welts of this type are in widespread use in the industry at a multiplicity of places.

The object of my invention is to provide such a strip; which is inexpensive; which presents as to the exposed bead portion a finished appearance; which includes a body or web portion which is tough, strong and sufficiently rigid to permit it to be inserted where used; and which web portion is provided on one side with a layer of soft, compressible cushioning material having an outer surface that is somewhat sticky.

Other objects, advantages, and meritorious features of my invention will more fully appear from the following description, appended claims and accompanying drawing, wherein:

Figure 1 is a perspective of a strip embodying my invention, the constituent parts of which are partially separated to show the construction, and Figure 2 is a sectional view through a fragment of an automobile body showing my strip in place, and Figure 3 is a perspective of a fragment of a modified form of my strip.

In the drawing let 10 indicate a strip of tough, strong, flexible sheet material such as woven fabric or artificial leather or the like, hard finished on one side to present a finished attractive appearance. A layer of soft compressible cushioning material 12 is adhesively secured to the opposite side of the strip 10, which layer or lamination may be formed of some suitable composition material.

A material which is suitable may be formed of small pieces of ground cork secured together by a suitable binder including rubber and other ingredients. This material has a slightly sticky or tacky outer surface. It is not very strong as compared with the strip 10 but it provides a facing thereon which is compressible and it has a high frictional coefficient due to its tacky surface and the thickness of this layer is preferably greater than that of the layer 10.

These two layers or laminations are rolled over along one edge over a core 14 which may be formed of paper, cord, or the like, forming a bead 16, which bead is adapted to cover the joint between the parts wherein the strip is used. The laminations are of course rolled over with the finished side of strip 10 outside.

In Figure 2 my improved welt strip is shown in use between a body portion 18 and a fender portion 20, such parts being secured together by the fastening means 22. The web portion of the strip has sufficient strength and rigidity to permit it to be inserted in place between the portions 18 and 20 and yet through the interposition of the relatively thick layer of soft compressible material 12, the strip completely fills the irregularities between the metal surfaces and forms close contact therewith and the joint is completely sealed against the ingress of dirt or other foul material thereinto.

In Figure 3 is shown a modification wherein the tough durable strip 10 is perforated as shown providing a plurality of closely spaced perforations therethrough, through which fastening means such as bolts or the like may be passed. The layer 12 is sufficiently easily pierced to permit of the fastening element being urged therethrough after being passed through one of the perforations in the strip 10. This type of construction eliminates the necessity of providing accurately spaced apart apertures for the fastening means.

What I claim:

1. An anti-squeak finish strip consisting of a lamination of strong, tough, flexible material hard finished on one side and a relatively thick lamination of soft compressible cushioning material including ground cork held together by rubber and characterized by having a tacky outer surface and adhesively secured to the opposite side of said first lamination, said two laminations being rolled over along one edge with the hard finished surface of the first lamination outside, forming a bead.

2. An anti-squeak strip consisting of a lamination of strong, tough, flexible, not easily puncturable sheet material hard finished on one side and provided with a plurality of longitudinally arranged closely spaced fastener receiving apertures and a relatively thick imperforate lamination of soft tacky compressible easily puncturable composition material adhesively secured to one side of the lamination of sheet material overlying the apertures therethrough, said apertures having a dimension lengthwise of the strip substantially greater than the dimension crosswise thereof, said hard finished sheet material being rolled over along a longitudinal margin forming a bead along said margin.

3. An anti-squeak strip consisting of a lamination of strong, tough, flexible, not easily puncturable sheet material provided with a plurality of linearly arranged apertures therethrough and a layer of soft compressible imperforate composition material adhesively secured to one side of the sheet material overlying said apertures, said composition material being relatively weak and easily puncturable opposite said apertures to permit of the insertion of fastening means therethrough, said apertures having a dimension lengthwise of the strip substantially in excess of the fastening means to be received therethrough.

4. An anti-squeak strip comprising an elongated narrow strip composed of relatively strong flexible material, and a second relatively thicker strip superimposing said first strip composed of soft compressible cushioning material having an inherently tacky condition, said strips being rolled over along one margin with the compressible tacky strip innermost and secured in this formation by the adhesive engagement of the compressible tacky strip, said rolled over formation leaving a portion of said compressible tacky strip exposed for adhesive engagement with the objects between which the strip may be placed.

5. An anti-squeak strip comprising a lamination of strong flexible material, a lamination of compressible composition cushioning material including ground cork and rubber adhesively secured to one side of the first lamination, said first lamination being hard finished upon the side opposite the composition lamination, a cord extending along one margin of said laminations, said two laminations being folded over said cord with the composition lamination innermost and adhesively secured together in said folded over relationship forming a bead along one margin of the strip.

6. An anti-squeak strip comprising a lamination of strong flexible material provided with a plurality of linearly spaced apart fastener receiving apertures, a lamination of compressible composition cushioning material adhesively secured to one side of the first lamination overlying said apertures, said composition cushioning lamination being relatively weak and easily puncturable opposite the apertures through the first lamination to permit of the puncturable insertion of fasteners therethrough.

EDWARD F. TANNEWITZ.